Figure 1A:
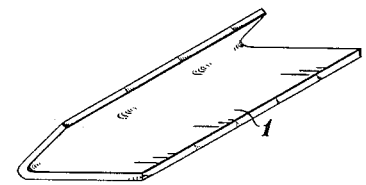
Figure 1B:
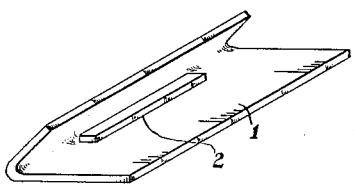
Figure 1C:
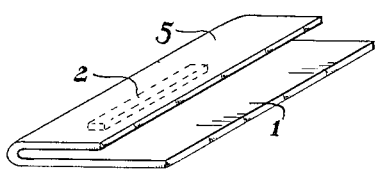
Figure 1D:
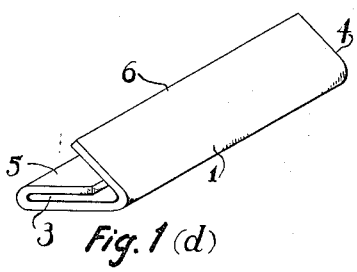
Figure 1E:
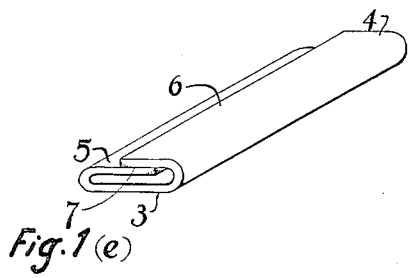
Figure 1F:
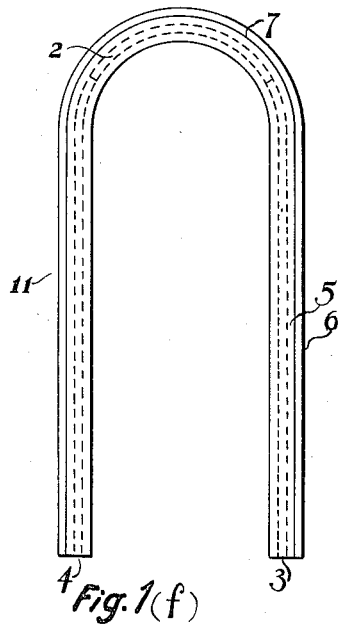
Figure 1G:
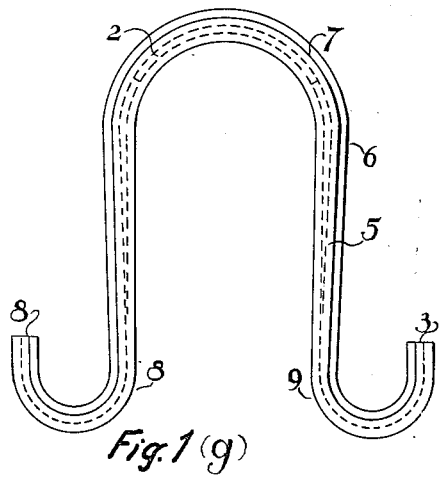

Aug. 7, 1956    R. C. SCHMIDT    2,758,239
GETTER AND METHOD OF MAKING SAME
Filed Sept. 13, 1952    2 Sheets-Sheet 1

INVENTOR.
ROBERT C. SCHMIDT
BY HIS ATTORNEY.
Paul B. Hunter

Aug. 7, 1956    R. C. SCHMIDT    2,758,239
GETTER AND METHOD OF MAKING SAME
Filed Sept. 13, 1952.    2 Sheets-Sheet 2

INVENTOR.
ROBERT C. SCHMIDT
BY HIS ATTORNEY
Paul B. Hunter.

United States Patent Office 2,758,239
Patented Aug. 7, 1956

2,758,239

GETTER AND METHOD OF MAKING SAME

Robert C. Schmidt, Redwood City, Calif., assignor to Varian Associates, San Carlos, Calif., a corporation of California Application September 13, 1952, Serial No. 309,415

5 Claims. (Cl. 313—174)

This invention relates, generally, to method and means for use in high vacuum techniques to obtain and maintain high vacuum in thermionic tubes and the like and, more particularly, concerns a novel getter and method of making the same.

Getter materials refer to those solids which have the ability to collect and retain gases by absorption or adsorption. There are several well known techniques for utilizing getter materials in vacuum enclosures such as vacuum tubes, one of which is flash gettering. Another technique is the use of bulk gettering. In flash gettering, chemically active metals which also possess the property of being volatile are evaporated within the tube by heating at or near the conclusion of the pumping process in evacuating such tubes. These metals are, for the most part, metals of the alkaline earth group. The metal vapor produced on evaporation diffuses around the vacuum space and condenses upon striking a cooler object in the tube. This vapor, before, during, and after condensation, reacts rapidly with all gaseous residues within the vacuum envelope other than noble gaseous residues and forms, on all cold parts of the tube, particularly on the tube walls, the so-called getter mirror. Barium (Ba) is a typical example of a flash gettering material and zirconium (Zr) is a typical example of a bulk gettering material.

The materials strontium (Sr), barium (Ba) and calcium (Ca) are the most suitable for use as flash getters in high vacuum electron tubes. Barium is the active ingredient of most flash getters, as heretofore constructed. Flash getters of pure barium have the disadvantage that unprotected pure barium reacts at room temperature with oxygen or with water vapor thereby becoming inactive. This effect of room temperature on pure barium may be prevented (1) by use of so-called "KIC" getters, i. e., those using a protective layer or casing in which the pure barium may be sealed until the barium is to be exposed within the evacuated tube, (2) by using alloys of barium that are inert at room temperature and (3) by generating barium in the evacuated tube by a chemical reaction between a stable barium compound and deoxidizing agents to form a getter material which is no longer inert but is highly reactive.

One great disadvantage heretofore obtained in using a getter material which is obtained by chemical reaction between a compound containing this getter material and deoxidizing agents is that, during the chemical reaction in which the deoxidizing agent is taking up the oxygen from the compound, portions of the compound break away from the deoxidizing agents before deoxidizing has completely taken place, these portions taking the form of particles which are loose within the tube. These loose residues have been found to seriously interfere with proper operation of the tube, particularly when the tube is subjected to severe accelerations and decelerations where the particles are caused to circulate inside the tube and interfere with the electron beam of the tube. Impurities in the compound also result in particles being loose in the tube after flashing.

The problem of loose particles also arises when a pure getter material such as barium is sealed within a protective layer or casing such as an iron tube to protect it at room temperature. In this case the tube is weakened at certain points so that when the barium is heated within the vacuum tube it bursts through the iron tube due to vapor pressure. In bursting through the iron tube, particles of iron break loose from the iron tube and circulate in the vacuum tube interfering with the electron beam. It is also extremely hard to maintain the barium in its pure form until ejected into the tube as vapor, owing to oxides formed in handling and resulting in residues appearing as particles after gettering.

One object of this invention is to provide a novel and improved getter and method for making the same.

Another object of this invention is to provide a novel getter that is so constructed and arranged as to prevent particles resulting from the gettering action from circulating within the vacuum enclosure.

Another object of this invention is to provide a novel method for making a getter comprising the step of enfolding the getter flashing material within an envelope that retains all of the material upon flashing with the exception of the vaporizing active portion of such material, thereby preventing other portions of the material from entering the electron beam space.

Another object of this invention is to provide new and novel getter apparatus consisting of getter materials including getter material compounds, said apparatus providing for the escape into the tube of certain sub-compounds or elements while retaining certain other elements or sub-compounds.

Further objects of the invention will presently appear as the description proceeds in connection with the appended claims and the annexed drawings wherein:

Figs. 1 (a) through 1 (g), inclusive, illustrate schematically the method of constructing the getter.

Figure 3:
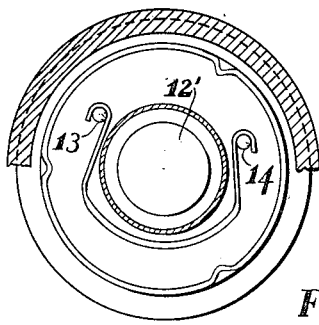
Figure 2:
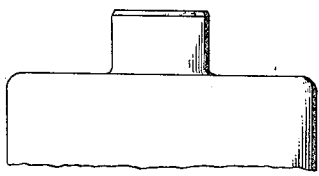
Figure 2:
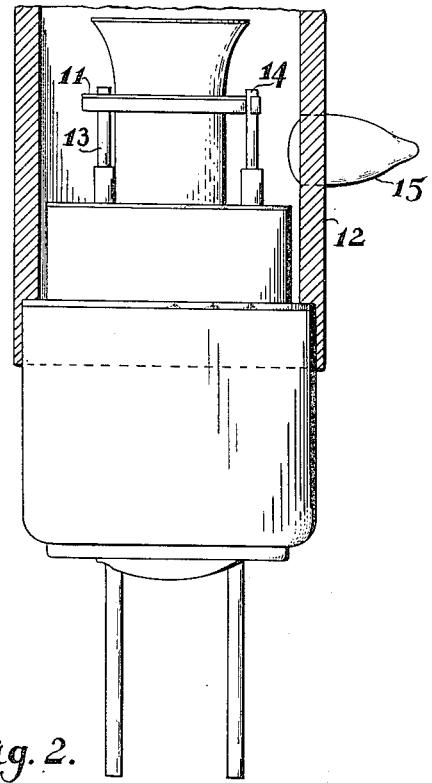

Figs. 2 and 3 depict in two views the getter mounted in a vacuum tube.

In the particular embodiment of the invention disclosed in the drawings, the technique of generating a pure flash getter material by chemical reaction between a stable compound and deoxidizing agents is utilized. For this purpose, barium carbonate ($BaCO_3$) is chosen. It should be understood that there are other well known getter compounds which could be used in lieu of $BaCO_3$, such as, for instance, barium beryliate ($BaBeO_2$), barium aluminate and strontium carbonate ($SrCO_3$).

In this one embodiment of the present invention, zirconium is paired with the barium carbonate to provide the desired clean up action as further explained hereafter. Tantalum could be used in lieu of zirconium.

Referring now to Figs. 1 (a) through 1 (g), there is shown a small rectangular sheet 1 of zirconium, for example, which may be about 0.6" x 0.075" and .002" thick. This rectangular sheet 1 is shown bent or creased in the longitudinal direction approximately ⅓ of the distance across its width. A small ribbon of zirconium 2 is coated with barium carbonate, which is in the form of a white powder, by means of a temporary binder such as nitro-cellulose dissolved in amyl acetate. This barium coated zirconium ribbon 2 is placed longitudinally in the crease of the zirconium sheet 1 midway between the ends of the sheet 1, and terminating short of the ends thereof. The short leg or fold 5 of the sheet 1 is then folded over the top of the ribbon 2. The sheet 1 is again folded longitudinally, forming fold 6 over the first fold 5, the sheet 1 thus forming an envelope of zirconium having a tightly closed seam 7 and open ends 3 and 4. The twice-folded zirconium sheet 1 with the barium carbonate coated ribbon 2 held therein is then bent in a U-shape with the seam 7 on the outer surface of the U. Bending the envelope with the seam 7 on the outside tends to bring the envelope folds 5 and 6 in closer contact, thus more tightly closing the seam opening 7. The ends 3 and 4 of this U-shaped envelope 11 are then turned up and the envelope 1 is pinched at two points 8 and 9 between the ends 3 and 4 of the envelope and corresponding ends of the coated ribbon 2 to close the ends of the envelope. The structure 11 thus formed constitutes a preferred form of the novel getter of this invention. The turned up ends 3 and 4 serve as mounting points for this getter. The ends 3 and 4 could be pinched before bending or simultaneously therewith. When the ends of the getter are sealed before bending, the seam will be slightly tighter than if the ends were sealed after bnding.

Referring to Figs. 2 and 3, the getter 11 is mounted within a vacuum tube body 12, having a cathode 12' therein, by means of wire supports 13 and 14 which also serve as conductors or terminals to carry heating current to the getter 11. The getter 11 is welded to the conductors 13 and 14 at its ends 3 and 4, this weld completely sealing the ends of the getter. Since the weld seals the ends of the getter, the step of pinching the getter at points 8 and 9 may be eliminated, if desired. The ends of the getter may be welded closed before the getter is mounted within the vacuum tube 12.

Operation of the getter during evacuation and gettering action will now be explained. During the pumping-out period when the tube is being evacuated through tube 15, heating current is passed through the getter 11 by way of the conductors 13 and 14 and at about 700° C. the barium carbonate $BaCO_3$ splits up into barium oxide (BaO) and carbon dioxide ($CO_2$). The carbon dioxide is pumped out; that carbon dioxide which is not pumped out will be taken up by the gettering materials at higher temperatures. Later, at about 1100° C., the barium oxide gives up its oxygen to the zirconium in the ribbon and envelope and the barium vaporizes. It is at this time that portions of the barium compound which have not had their oxygen removed drop from the coated ribbon of zirconium. Heretofore these particles would move away from the heat and never deoxidize and in many cases hinder operation of the tube. In the present invention, the particles are held within the zirconium envelope until such time as they react to give up oxygen and barium vapor. The barium in the vapor stage escapes from the zirconium envelope through the tightly closed but not vapor-sealed seam 7 and diffuses through the tube 12, condensing on the colder parts of the tube 12 and absorbing all the gaseous residues. At this time the tube is sealed off. Since the seam 7 is small and tight, the barium vapor only is allowed to escape and all residues in powder or particle form are retained within the zirconium envelope and so cannot escape into the body of the tube and interfere with the passage of the electron beam. The getter 11 is mounted in the tube 12 so that the barium vapor passing through the seam 7 is directed within the tube so as not to settle on parts of the tube 12 which would cause impairment of operation.

Because of the novel construction of this getter with the overlapping seam on the outer perimeter of the bent getter, the seam is very tight. But, as the getter is heated by the current passing therethrough to release the getter material in vapor form, the getter tends to expand slightly due to the heat and this causes the seam to tighten up to an even greater extent and therefore improve an already effective seam.

Although the invention has been described using a zirconium envelope and a barium carbonate flashing getter material, as has been pointed out previously in the above description other getter materials may be used both for the envelope and for the flashing getter material. The envelope need not be of a getter material. It is also obvious that the sheet material need not necessarily be folded as shown in the drawings. The containers or envelopes could be folded in other manners so long as they are not vaportight but closed enough to hold residues and particles entrapped.

Since many changes could be made in the above construction of the getter and many apparently widely different embodiments of this invention could be made without departing from the scope thereof, such as, for example, the use of a porous tungsten or zirconium capsule as a flashing getter material container thus eliminating folding operations, it is intended that all matter contained in the above description or shown in the accompanying drawings shall be interpreted as illustrative and not in a limiting sense.

What is claimed is:

1. The method of making a getter for use in vacuum tubes which comprises placing the getter material on a sheet of solid material, folding one edge of the sheet over the getter material, folding the opposite edge of the sheet over the first fold of the sheet so as to produce an envelope of the sheet material having a tightly closed overlapping seam and open ends, sealing the open ends, and putting a bend in the envelope with the seam on the outer side of the bend.

2. A getter for use in vacuum tubes comprising a ribbon of zirconium coated with barium carbonate and a sheet of zirconium, said coated ribbon being within said zirconium sheet with one edge of said sheet folded over the ribbon and the opposite edge folded over the top of said first fold whereby a tightly closed, overlapping seam is provided, the ends of said folded zirconium sheet being sealed closed, said folded sheet being bent in a curve so that the overlapping seam is on the outer side of the bend.

3. In combination, an electron beam discharge device including an evacuated body having cathode means therein for producing a beam of electrons, a getter mounted within said body comprising a getter material and a sheet of solid material wrapped around and completely enveloping said getter material, the sheet being so wrapped as to provide one fold over the getter material and another fold overlapping said one fold whereby an overlapping seam is formed, the folded sheet being bent in a curve with the overlapping seam on the outer side of the curve such that the seam is tightly closed but not airtight so as to retain all residues within the sheet envelope after the gettering action except constituents of the getter material in the vapor and gaseous stage to thereby prevent interference with the beam by getter particles, and means for providing a heating current to said getter wthin said vacuum envelope.

4. The method of making a getter for use in vacuum devices which comprises the steps of coating the getter material on a strip of solid material and then placing the coated material on a sheet of solid, nonrupturable material, folding one edge of said sheet over said strip of coated solid material, folding the opposite edge of said sheet over the first fold of the sheet so as to produce an envelope of the sheet material having a tightly closed overlapping seam and open ends, and sealing the open ends so that all of the getter material will be retained within the envelope of solid sheet material after flashing with the exception of the constituents of the getter material which pass out from the envelope through said tightly closed overlapping seam in the vapor or gaseous stage such that no particles of getter material or envelope material will be loosed within the vacuum device.

5. A getter for use in vacuum devices comprising a flashing getter material coated on a strip of solid material and a sheet of solid, nonrupturable material, said strip of coated material being within said sheet with one edge of said sheet folded over the strip and the opposite edge folded over the top of said first fold whereby a tightly closed, overlapping seam is provided, the ends of said folded sheet being sealed closed whereby said flashing getter material is completely enveloped, said folded sheet being vent in a curve so that the overlapping seam is on the outer side of the bend, said enveloping sheet thereby being airtight except for said tightly closed seam so that all residues within the envelope are retained after flashing except constituents of the flashing getter material in the vapor or gaseous stage which escape through said seam.

References Cited in the file of this patent

UNITED STATES PATENTS

| | | |
|---|---|---|
| 1,623,323 | Van Voorhis | Apr. 5, 1927 |
| 1,967,575 | Hunter | July 24, 1934 |
| 1,990,041 | Loewe | Feb. 5, 1935 |
| 2,094,675 | Salzberg | Oct. 5, 1937 |
| 2,130,190 | Lederer | Sept. 13, 1938 |